United States Patent
Kuroda

(10) Patent No.: US 7,233,411 B2
(45) Date of Patent: Jun. 19, 2007

(54) INFORMATION PROCESSING APPARATUS, PRINT DATA GENERATING METHOD, PRINT CONTROL PROGRAM, AND COMPUTER-READABLE RECORDING MEDIUM

(75) Inventor: Shigeki Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/014,430

(22) Filed: Dec. 14, 2001

(65) Prior Publication Data

US 2002/0080405 A1  Jun. 27, 2002

(30) Foreign Application Priority Data

Dec. 26, 2000  (JP)  ............................. 2000-396173
Nov. 1, 2001  (JP)  ............................. 2001-336847

(51) Int. Cl.
  *G06F 3/12*  (2006.01)
  *G06K 15/00*  (2006.01)
  *G03G 15/00*  (2006.01)

(52) U.S. Cl. ..................................... 358/1.18; 358/1.9

(58) Field of Classification Search ................. 358/1.5, 358/403, 452, 453, 1.12, 1.9, 1.1–1.18, 296; 101/7; 347/19–20

See application file for complete search history.

(56) References Cited

U.S. PATENT DOCUMENTS

| 4,188,025 | A | * | 2/1980 | Gusfafson et al. | ........... 271/314 |
| 5,007,625 | A | * | 4/1991 | Kremers et al. | ........ 270/58.01 |
| 5,495,561 | A | * | 2/1996 | Holt | ............................ 358/1.15 |
| 5,501,442 | A | * | 3/1996 | Mandel | .................. 270/58.07 |
| 5,774,778 | A | * | 6/1998 | Adachi et al. | .............. 399/403 |
| 5,845,058 | A | * | 12/1998 | Shaw et al. | ................. 358/1.15 |
| 6,421,523 | B1 | * | 7/2002 | Kondo et al. | ............... 399/404 |
| 2002/0085870 | A1 | * | 7/2002 | Konishi et al. | ............... 400/76 |

FOREIGN PATENT DOCUMENTS

| EP | 0 729 118 A2 | 8/1996 |
| EP | 729118 A2 * | 8/1996 |
| JP | 5-64925 | 3/1993 |
| JP | 8-262931 | 10/1996 |
| JP | 11-34410 | 2/1999 |

OTHER PUBLICATIONS

Official Communication/Search Report (dated Feb. 24, 2004).

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

When an Offset or rotation sort output is designated as an output style, whether document data of one copy is printed to one paper (physical sheet) and outputted or not is discriminated. When it is printed to one paper, it is intended to enable the print such that the Offset or rotation output is not performed. An information processing apparatus has: a finishing command setting unit which can set a finishing command to a printer so as to rotation-sort-output or Offset-output the document data; and a counter for counting the number of physical sheets to which the document data of one copy whose output is desired is allocated. The finishing command setting unit sets the finishing command in a manner such that when the document data of one copy is printed onto one physical sheet as a result of the counting by the counter, the rotation sort output or the Offset output is not performed, and when the document data of one copy is printed onto two or more physical sheets, the rotation sort output or the Offset output is performed.

13 Claims, 10 Drawing Sheets

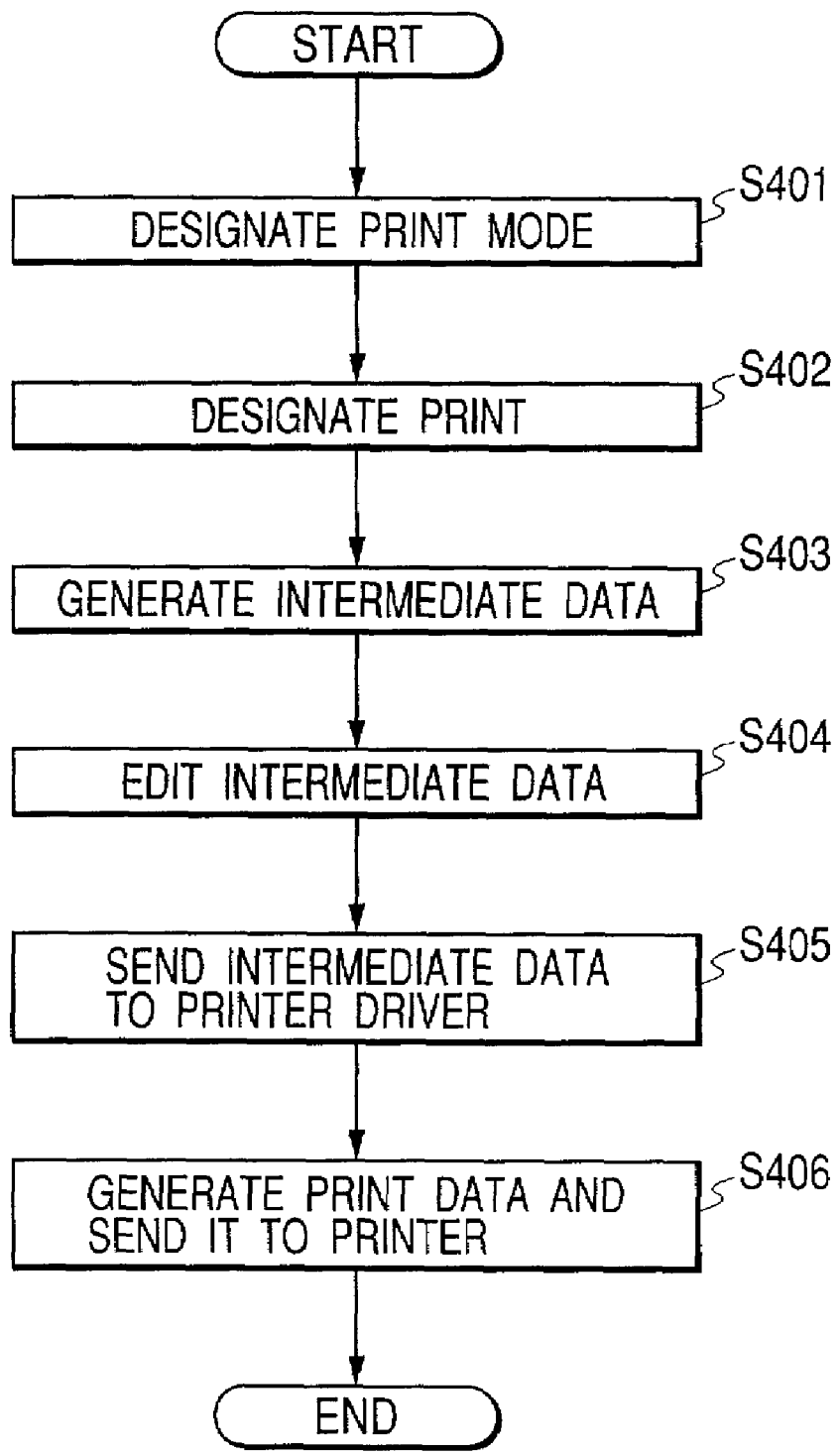

FIG. 5

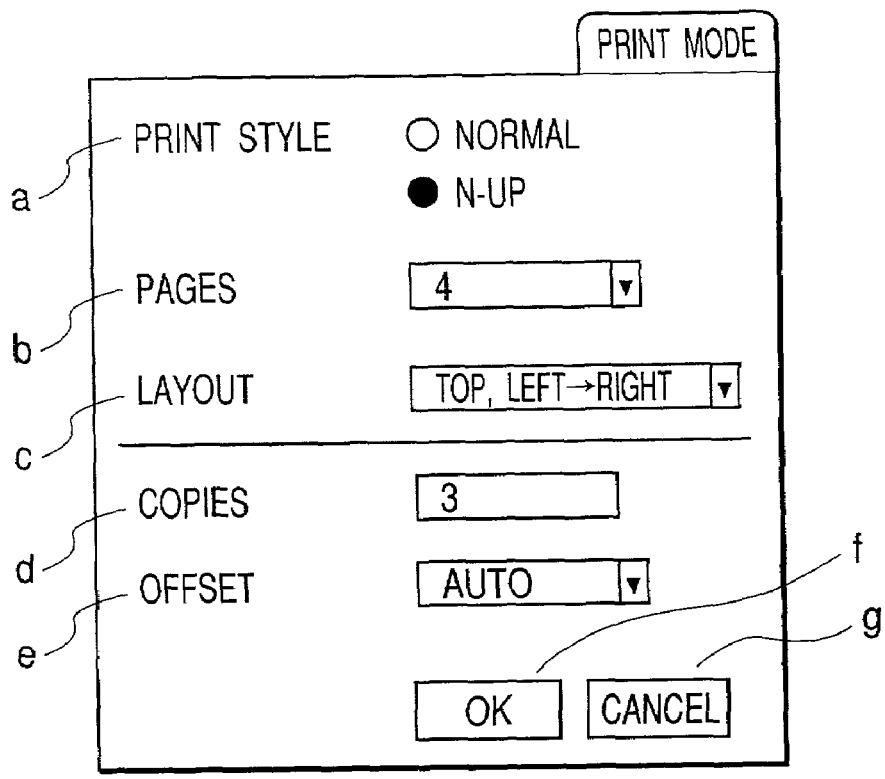

FIG. 6

[JOB START] PRINTER INITIALIZATION ( [FINISHING] [NO. OF COPIES] [PAPER SIZE] [PRINT DIRECTION] ··· ) DRAW ( [PRINT CHR] [COLOR] [DRAW FIG] [DRAW IMAGE] [FORM FEED] ····
[COLOR] [PRINT CHR] [PRINT CHR] ····[COLOR] [DRAW FIG]
····[COLOR] [PRINT CHR] [PRINT CHR] ···· [FORM FEED]
[PRINT CHR] [PRINT CHR] ····[COLOR] [DRAW FIG] ····[FORM FEED]
[COLOR] [PRINT CHR] ····[DRAW IMAGE] ····[COLOR]
[PRINT CHR] ···· [FORM FEED] [PRINT CHR] ····) [JOB END]

FIG. 8
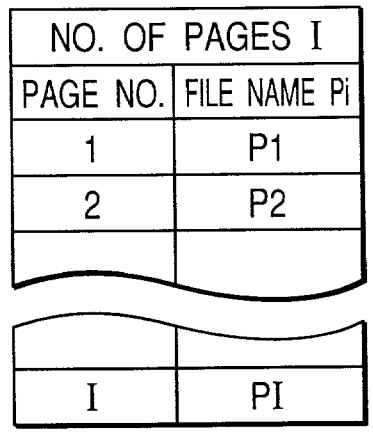
PAGE INFO FILE
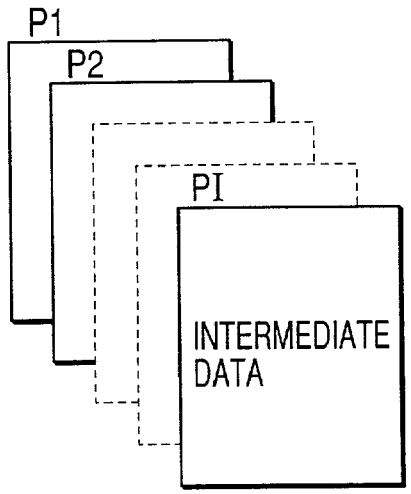
INTERMEDIATE
DATA FILE
(PAGE Pi)
FIG. 9
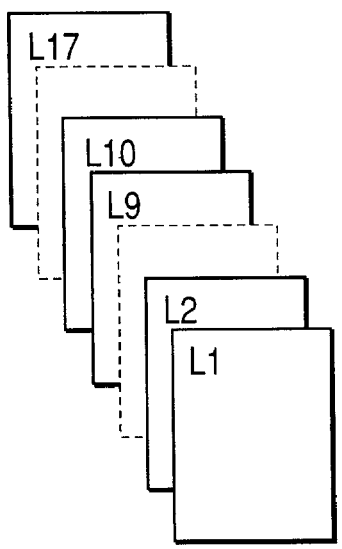
LOGICAL PAGE Li
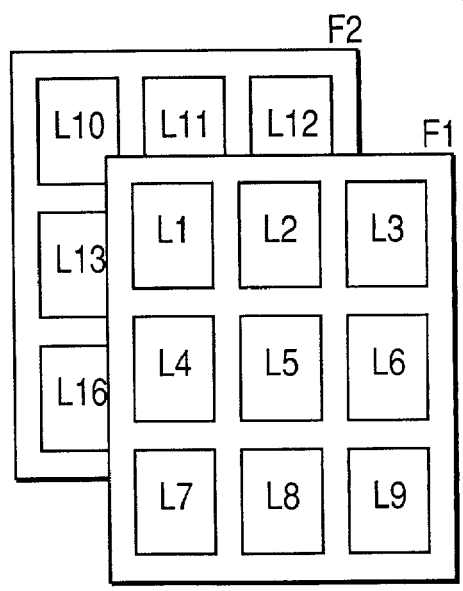
PHYSICAL PAGE Fi
(9-UP)

INFORMATION PROCESSING APPARATUS, PRINT DATA GENERATING METHOD, PRINT CONTROL PROGRAM, AND COMPUTER-READABLE RECORDING MEDIUM

BACKGROUND OF THE INVENTION

1. Field of the Invention

The invention relates to an information processing apparatus, a print data generating method, a print control program, and a computer-readable recording medium, in which a desired print result can be obtained in a print style which is set by an information processing apparatus such as a personal computer or the like connected to a printer.

2. Related Background Art

Hitherto, in a printing process in a system comprising a printer having a function for printing on a page unit basis and an information processing apparatus such as a personal computer connected to the printer, as a printing method of performing a page control, a page layout print (N-up printing) such that a plurality of logical pages (N pages) are reduced and arranged into one physical page (one side of one sheet of a print paper) has been known. Such a layout print is also a printing method suitable when the user wants to save output pages or a draft print or the like is executed. For example, two logical pages (output pages from an application) are layout-printed (2-up printing) into one page of the paper, thereby enabling the number of output papers to be saved to about the half (in case of a simplex printing).

As another page layout print, a 4-up printing such that four logical pages are layout-printed into one physical page has been known. Similarly, an 8-up printing, a 9-up printing, a 16-up printing, and the like have been known. As a layout direction in one physical page, it has also been known that the direction from the right to the left, the direction from the top to the bottom, and the like are possible. To realize the layout print, a method whereby when a print mode of document data or the like is instructed on the information processing apparatus side, the operator designates a page layout print mode, designates the number of logical pages which are arranged into one physical page, and further, designates the layout direction has been known. It has also been known that when the page layout mode is once designated, the mode setting is valid until the layout mode is designated again.

In a printer having a duplex printing function, it has also been known that when an executing mode of the duplex printing is designated on the information processing apparatus side and the designated mode is transmitted to the printer, the duplex printing function is executed on the printer side without executing any special processes on the information processing apparatus side.

Further, in a printing process in a system comprising a printer having a function for printing on a page unit basis and an information processing apparatus such as a personal computer or the like connected to the printer, as a printing method of performing an output style (finishing) control, a method of performing a sorting process in case of a printer having sorter bins and changing the output bin on a copy unit basis, thereby making the sorting operation easy has been known. Also in a printer having no sorter bin, an Offset output such that output positions are alternately slightly deviated and the papers are outputted on a copy unit basis, a rotation output such that the direction of the paper is rotated by 90° and the papers are outputted on a copy unit basis, and the like have been known. The Offset output and the rotation output will now be described with reference to FIGS. 13A, 13B, and 14.

FIGS. 13A and 13B are diagrams for explaining the Offset output in the case where three copies of a document in which one copy is constructed by three pages are outputted. FIG. 13A shows an example in the case where all pages are deviated in a lump and outputted on a copy unit basis. An arrow in the diagram indicates the direction in which the papers are ejected from the printer. The diagram illustrates a state where the second copy is deviated from the first copy in the direction (lateral direction) which crosses perpendicularly to the printer ejecting direction and outputted. Further, the diagram shows a state where the third copy is outputted to the same position as that of the first copy so that it can be distinguished from the second copy. As mentioned above, according to the Offset output, the copies are outputted by alternately changing the output positions every different copy.

FIG. 13B shows a state where only the head page of each copy is deviated in the lateral direction and the papers are outputted. As mentioned above, it has been known that there are two kinds of methods in the Offset output.

FIG. 14 is a diagram for explaining the rotation output in the case where three copies of a document in which one copy is constructed by three pages are outputted. An arrow in the diagram similarly indicates a direction in which the papers are ejected from the printer. The diagram shows a state where the second copy is rotated by 90° and the papers are outputted. As mentioned above, according to the rotation output, the output papers are rotated by 90° every different copy and the papers are outputted.

However, according to the above method, even if the number of output papers to which one copy of the print data which the user wants to print is printed is equal to one, so long as the Offset output or rotation output is instructed, each copy is Offset-output or rotation-output. Generally, if the number of print papers to which one copy of the print data is equal to 1, it can be sorted without Offset-outputting or rotation-outputting. On the contrary, to the operator, if the Offset output or rotation output is not performed, the print paper can be rather easily picked up and arranged. There is, consequently, a problem such that in a document comprising a plurality of copies, when the number of papers to which one copy of the print data is equal to 1, if the Offset output or rotation output is performed, the print papers become bulky and it is difficult to arrange them.

In a case where the papers to which the print data of one copy is ejected as one sheet of paper from the printer as mentioned above, although a method whereby the user preliminarily turns off the ON-state of a check box of "Offset output" or "rotation sort" by using a print mode setting function of a printer driver is also considered, there is a problem such that if the user is allowed to designate each time a printing instruction is issued, a burden on the user increases.

To install an automatic discriminating process into the printer side, not only development costs or product costs rise but also a pre-paper feed cannot be performed or the like. There is a risk of reduction in printing throughput.

SUMMARY OF THE INVENTION

The invention is made in consideration of the above conventional techniques and it is an object of the invention to provide an information processing apparatus, a print data generating method, and a print control program, in which when the Offset output or rotation sort output has been designated as an output style, whether document data of one copy is printed onto one sheet of paper (physical sheet) and outputted or not is discriminated, and in the case where the document data is printed to one sheet of paper, it is intended to generate print data which can set a printing such that the Offset output and the rotation output are not performed, and to also provide a computer-readable recording medium which stores such a program.

To accomplish the above object, according to the invention, there is provided an information processing apparatus comprising: finishing command setting means which can set a finishing command to a printer so as to rotation-sort-output or Offset-output document data; and counting means for counting the number of physical sheets to which the document data of one copy whose output is desired is allocated, wherein the finishing command setting means sets the finishing command in a manner such that in the case where the document data of one copy is printed onto one physical sheet as a result of the counting operation by the counting means, the rotation sort output or the Offset output is not performed, and in the case where the document data of one copy is printed onto two or more physical sheets, the rotation sort output or the Offset output is performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a flowchart showing processes of the information processing apparatus according to the embodiment;

FIG. 5 is a diagram showing a UI picture plane for designating information necessary for the processes in the embodiment;

FIG. 6 is a diagram showing data necessary for the processes in the embodiment;

FIG. 8 is a diagram showing a structure of files necessary for a printing process in the embodiment;

FIG. 9 is a diagram showing an output result in the embodiment;

DETAILED DESCRIPTION OF THE PREFERRED EMBODIMENTS

Preferred embodiments according to the invention will be described in detail hereinbelow with reference to the drawings.

First Embodiment

Figure 1:
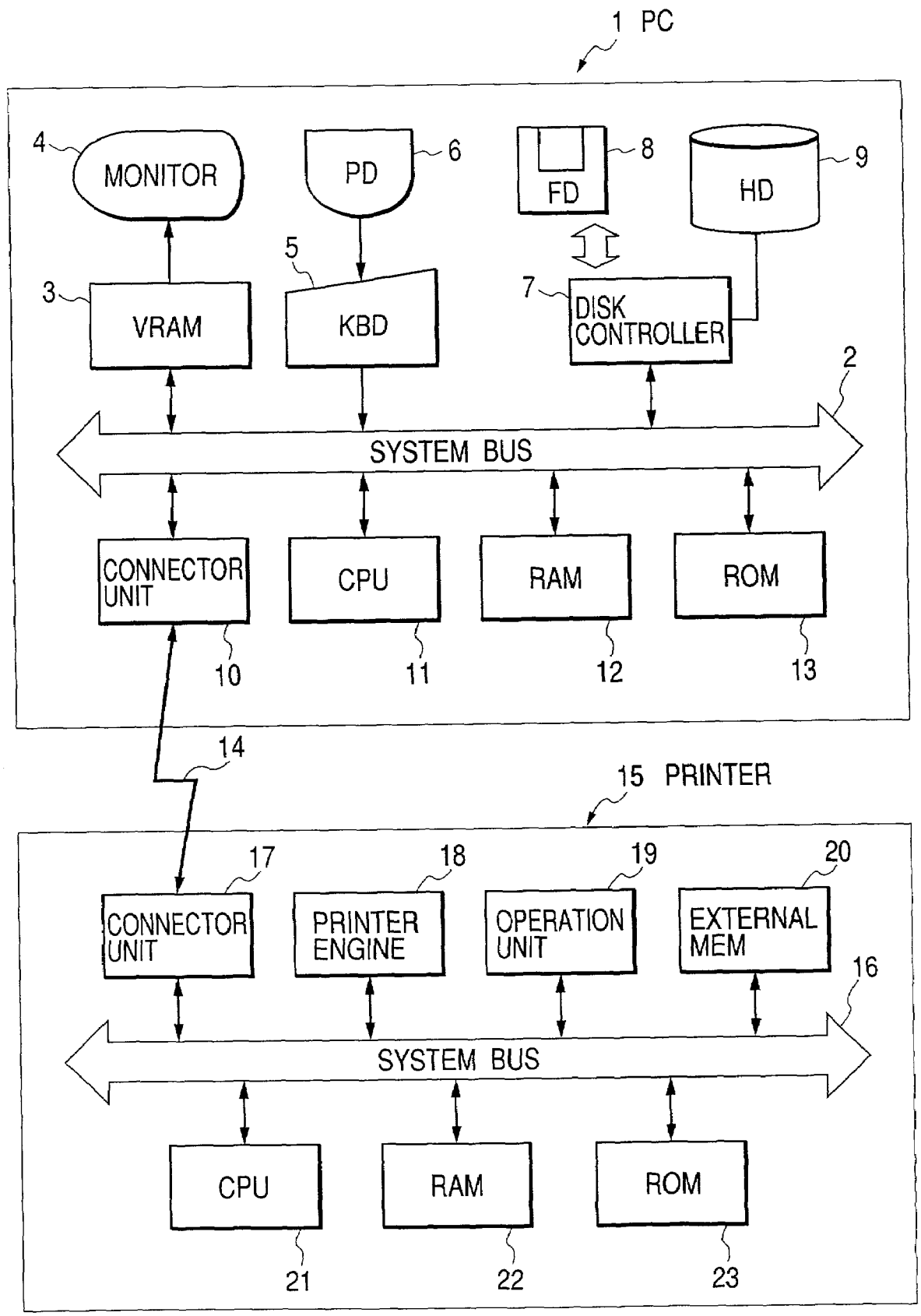
FIG. 1 is a block diagram showing a schematic construction of an information processing apparatus according to an embodiment of the invention.

FIG. 1 is a block diagram showing a construction of an information processing apparatus according to the first embodiment. In the diagram, reference numeral 1 denotes an information processing apparatus such as a personal computer (PC) or the like comprising, as main component elements: a video memory (hereinafter, VRAM) 3; a monitor 4; a keyboard (hereinafter, KBD) 5; a pointing device (hereinafter, PD) 6; a disk controller 7; a hard disk (hereinafter, HD) 9; a connector unit 10; a CPU 11; an RAM 12; and an ROM 13. Those component elements are mutually connected via a system bus 2. Details of the component elements will be described hereinlater.

The CPU 11 controls the whole information processing apparatus 1 in accordance with a program shown in FIG. 2 and the like, which will be explained hereinlater. The RAM 12 stores a program as a main memory of the CPU 11 and also has a temporary memory area for various data which is used as a work data area upon execution of the control by the CPU 11.

The disk controller 7 performs a control of an access to an external memory such as HD 9, FD 8, or the like.

The HD 9 and FD 8 are devices for recording data into a magnetic memory medium on a disk and reading and writing it to/from the medium. The HD 9 and FD 8 store: various document data such as text data, graphic data, and the like; further, a boot program of the information processing apparatus 1 which is downloaded into the RAM 12 and executed; an operating system (OS) as a control program of the CPU 11; various application programs; a printer control command (print data) generating program (printer driver); a present print system program having a synthesizing function and the like of the print data; and the like. The memory medium is not limited to the hard disk and the floppy disk but can be a magnetic tape, a CD-ROM, an IC memory card, a DVD, and the like.

The ROM 13 is an internal memory in which various data and programs have been stored in a manner similar to the HD 9, FD 8, and the like as mentioned above.

The monitor 4 displays a user interface (UI) such as various figures such as bit map data and the like, a command image or the like of command menu, messages from the operator, and the like in the information processing apparatus 1 onto a screen. The monitor 4 comprises a CRT (Cathode Ray Tube), a liquid crystal, an FLC, or the like.

The VRAM 3 stores data to be displayed on the monitor 4.

The KBD 5 and PD 6 are operated by the operator and used for inputting various data, commands, print mode, or the like by the operator. The command image or the like of the command menu displayed on the screen of the monitor 4 is selected by the KBD 5 or PD 6, so that the execution of the command or the print mode can be instructed.

The connector unit 10 is connected to a connector unit 17 of a printer 15 via a predetermined bidirectional interface 14 such as Centronics interface, network interface, or the like and executes a communication control process with the printer 15, which will be explained hereinlater, for example, executes transmission of a printer control command (print data) or the like.

The printer 15 comprises, as main component elements: a connector unit 17; a printer engine 18; an operation unit 19; an external memory 20; a CPU 21; an RAM 22; and an ROM 23. Those component elements are mutually connected via a system bus 16. Details of the component elements will be described hereinlater.

The CPU 21 is a printer CPU for controlling the whole printer 15. The CPU 21 transmits an image signal to the printer engine 18 by the printer control command (print data) received by the connector unit 17 on the basis of a control program stored in the ROM 13 or external memory 20, which will be explained hereinlater.

As a main memory of the CPU 21, the RAM 22 has a temporary memory area for various data which is used as a work data area upon execution of the control by the CPU 21.

The external memory 20 can be also connected as an option to the printer and stores font data, an emulation program, form data, and the like.

The ROM 23 is a printer internal memory in which various data, the printer control program for controlling the printer, and the like have been stored in a manner similar to the external memory.

The printer engine 18 is controlled by the CPU 21, receives the image signal generated through the system bus by the control program stored in the ROM 23 or external memory 20, and executes the actual printing.

The operation unit 19 comprises: an input unit such as operation panel, operation switches, and the like; a display unit such as LED, liquid crystal panel, etc.; and the like. The operation unit 19 receives the operation of the operator and displays a result of the operation. The operator can designate and confirm the setting of the printer 15 through the operation unit 19.

The connector unit 17 is connected to the connector unit 10 of the information processing apparatus 1 via the bidirectional interface 14 and can receive the printer control command and notify a state in the printer or the like.

Further, although not shown, the printer 15 has: a paper feed unit for feeding the papers; paper ejecting bins on which the papers ejected from the printer 15 are stacked; a paper ejecting tray; and the like. The paper ejecting bins and paper ejecting tray can be used for the Offset output and the rotation output.

Subsequently, processing steps which are executed until a print processing apparatus having a synthesizing function of the print data and the like in the information processing apparatus 1 of the embodiment operates will be further described with reference to FIGS. 1 to 3 mentioned above.

The CPU executes a basic I/O program (BIOS), an operating system (OS), and a print processing program, so that the print processing apparatus operates.

The BIOS has been written in the ROM 13. The operating system (OS) has been written in the external memory such as HD 9, FD 8, or the like.

First, when a power source of the information processing apparatus 1 is turned on, the operating system (OS) stored in the external memory such as HD 9, FD 8, or the like is read out and loaded into the RAM 12 by an initial program loading (IPL) function in the BIOS and the OS is made operative.

Subsequently, the operator selects the command image or the like on the command menu displayed on the screen of the monitor 4 by the KBD 5 and PD 6 and instructs the execution of an application. Thus, the application stored in the external memory such as HD 9, FD 8, or the like is read out and loaded into the RAM 12 and the application is made operative.

Subsequently, by a procedure similar to that upon activation of the application, when the printing is instructed by the operator, the print processing module having the synthesizing function of the print data and the like and the printer control command generating program (printer driver) which have been stored in the external memory such as HD 9, FD 8, or the like are read out and loaded into the RAM 12 and the print processing system is made operative.

In case of the embodiment, the print processing module and the related data have been stored in the FD 8. FIG. 3 shows a construction of the recorded contents. The contents include volume information, directory information, a print processing execution file, a print processing related data file, and the like.

The print processing module and the related data stored in the FD 8 can be also loaded into the information processing apparatus via the disk controller 7. When the FD 8 is set into the disk controller 7, the print processing module and the related data are read out from the FD 8 under the control of the OS and the BIOS and loaded into the RAM 12, so that they can be operated.

Figure 2:
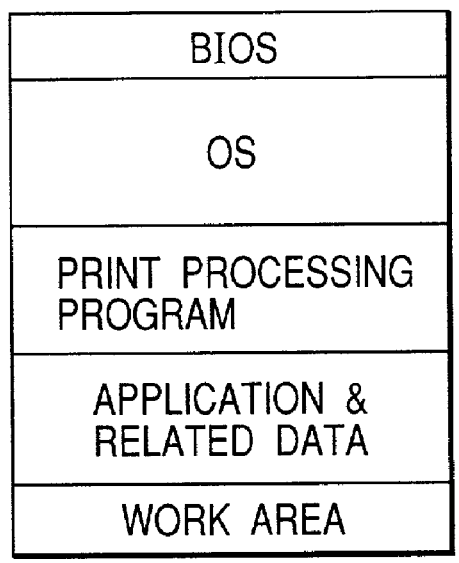
FIG. 2 is a diagram showing a memory map in the embodiment.
Figure 3:
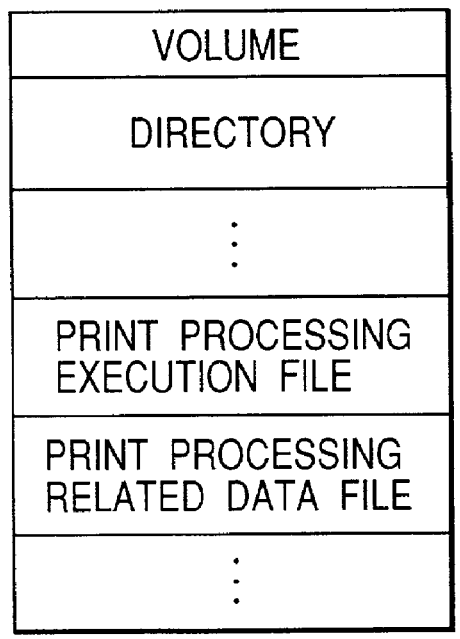
FIG. 3 is a diagram showing a construction of a memory medium in the embodiment.

FIG. 2 shows a memory map in a state where the print processing program has been loaded into the RAM 12 and can be executed. The BIOS, OS, print processing program, application program, related data, and work area are stored and formed in the RAM 12.

Subsequently, an operating method of the print processing system having an auto page layout function or the like of the print data in the information processing apparatus 1 of the embodiment will be described with reference to flowcharts, a user interface (UI) picture plane diagram, data format diagram, and table and output examples in FIGS. 4 to 12.

The processes are started in a state where the program such as a printable application or the like is operating by the foregoing processing steps.

According to the embodiment, when a printing process of the document data is designated by the application, the N-up printing is designated, the Offset output is further selected as an output style, and an Auto mode is designated, an intermediate data writing program converts the document data received from the application into intermediate data, the intermediate data is temporarily stored as an intermediate data file, the total number (I) of logical pages is calculated, and further, a page information file in which page information including the calculated total number of pages is generated. After that, in an intermediate data editing program, the page information file is read, the number of physical sheets of the document data of one copy is calculated, and if the number of physical sheets is equal to 1, a command to turn off an Offset mode is set. After that, an intermediate data output program outputs the intermediate data to the printer control command generating program (printer driver) or a program existing in the step at the front stage thereof. Finally, the printer control command generating program (printer driver) generates the printer control command and executes the printing.

FIG. 4 is a flowchart showing a flow of the print processing system in the embodiment. First, in step S401 in FIG. 4, a print style, the number of pages, a layout order, the number of print copies, and the Offset mode as finishing command setting means for setting an output style are designated by the mode setting UI serving as print mode setting means for making the print processing system function.

In step S402, subsequently, the printing is designated. The designation of the print mode and the printing can be also instructed by a method whereby the system is operated by the KBD 5 and PD 6 in FIG. 1 mentioned above and the command image or the like on the command menu displayed on the screen of the monitor 4 is selected.

Subsequently, step S403 follows and the intermediate data is generated. When the intermediate data is generated in step S403, step S404 follows and the intermediate data is edited.

Step S405 follows and the intermediate data is sent to the printer driver. In step S406, the printer control command (print data) is generated and sent to the printer. This process is a normal printing step which is executed by the printer control command generating program (printer driver). The printing process is finished.

Subsequently, the designating method of the print mode in step S401 will be described in detail with reference to FIG. 5.

FIG. 5 shows a print mode designating UI in case of designating the print mode in step S401 in FIG. 4 in the embodiment. In the diagram, (a) denotes a switch for designating the N-up printing as a print style. The switch (a) has a normal print button for designating the normal printing and an N-up print button for designating the N-up printing. Those switches are alternative switches and only one of them can be selected. FIG. 5 shows a state where the N-up printing has been selected and a check box of the N-up printing button is reversed in black.

(b) denotes a combo box for designating the number of pages in the N-up printing. When a downward arrow button on the right side in a box is clicked, the number of pages which can be designated in the N-up printing, for example, "2", "4", "8", "9", "16", or the like can be sequentially selected. FIG. 5 shows a state where "4" pages are selected as the number of pages has been selected. That is, by this setting, a layout such that four logical pages are arranged in one page of the physical sheet is selected.

(c) denotes a combo box for designating a layout order in the N-up printing. When a downward arrow button on the right side in a box is clicked, the layout order according to the number of logical pages mentioned above can be designated in the N-up printing. That is, one of "top, left→right", "top, right→left", "top, left→down", "top, right→down", and the like can be selected. FIG. 5 shows a state where "top, left→right" has been selected as a layout order.

(d) denotes a combo box for designating the number of copies. FIG. 5 shows a state where "3 copies" has been selected.

(e) denotes a combo box for designating the Offset mode as an output style. When a downward arrow button on the right side in a box is clicked, one of ON, OFF, and Auto can be sequentially selected. ON denotes a mode in which the Offset output is always performed. OFF denotes a mode in which the Offset output is not performed. Auto denotes a mode in which the Offset printing is not automatically performed in the case where the print data of one copy in the embodiment is outputted onto one sheet of print paper.

In the diagram, (f) denotes an OK button switch which is selected when the designated mode is determined. (g) denotes a cancel button which is selected when the designated mode and the designation of the print mode are cancelled.

When the mode is determined by selecting the OK button (f), the information indicative of the print mode and the like is temporarily stored into the work area and can be referred to in a subsequent processing step.

If the printer main body supports a duplex printing function, a duplex printing can be also instructed on the setting picture plane shown in FIG. 5.

A method for a plural-copy printing will be subsequently described with reference to FIG. 4. The number of copies designated in (d) in FIG. 5 is referred to in the sending of the intermediate data in step S405 in FIG. 4. When a plurality of-copies are sent, it is realized by repeating an intermediate data sending process in step S405 the number of times corresponding to the number of copies designated in (d) in FIG. 5.

The method of generating the intermediate data in step S403 will now be described with reference to FIGS. 6 and 7.

FIG. 6 shows a draw command of the document data which is transmitted to the information processing apparatus when the print execution is designated from the application or the like in step S402 in FIG. 4 of the embodiment.

As shown in FIG. 6, the draw command starts from a "job start command" and ends at a "job end command". A printer initialization command appears next to the "job start command" and comprises a "finishing command", a "No. of copies command", a "paper size command", a "print direction command", and the like. The "finishing command" includes an Offset designation command serving as an output style and the like.

The draw command has a "print chr (print character) command", a "color command", a "draw fig (draw figure) command", a "draw image command", a "form feed command", and the like. The "color command" is a command for previously designating the colors in case of the "print chr command" and the "draw fig command". The color of a character or a figure which is printed subsequently is designated by an RGB format. As a general image data format, a color data table of the RGB format is included in a data portion in the "draw image command". The color of each pixel in case of drawing an image is designated by a method whereby each pixel value indicates an index of the color table. As other information, bit map data, information showing a width, a height, and coordinates of a drawing position, and the like are also included in the "draw image command".

Further, information showing a character type, a character code, coordinates of a character printing position, a character width, a character height, a character feed width, a line feed height, and the like is included in the "print chr command". A kind of drawing figure, an attribute of each of the drawing figures, information of the drawing position coordinates, and the like are also included in the "draw fig command".

Figure 7:
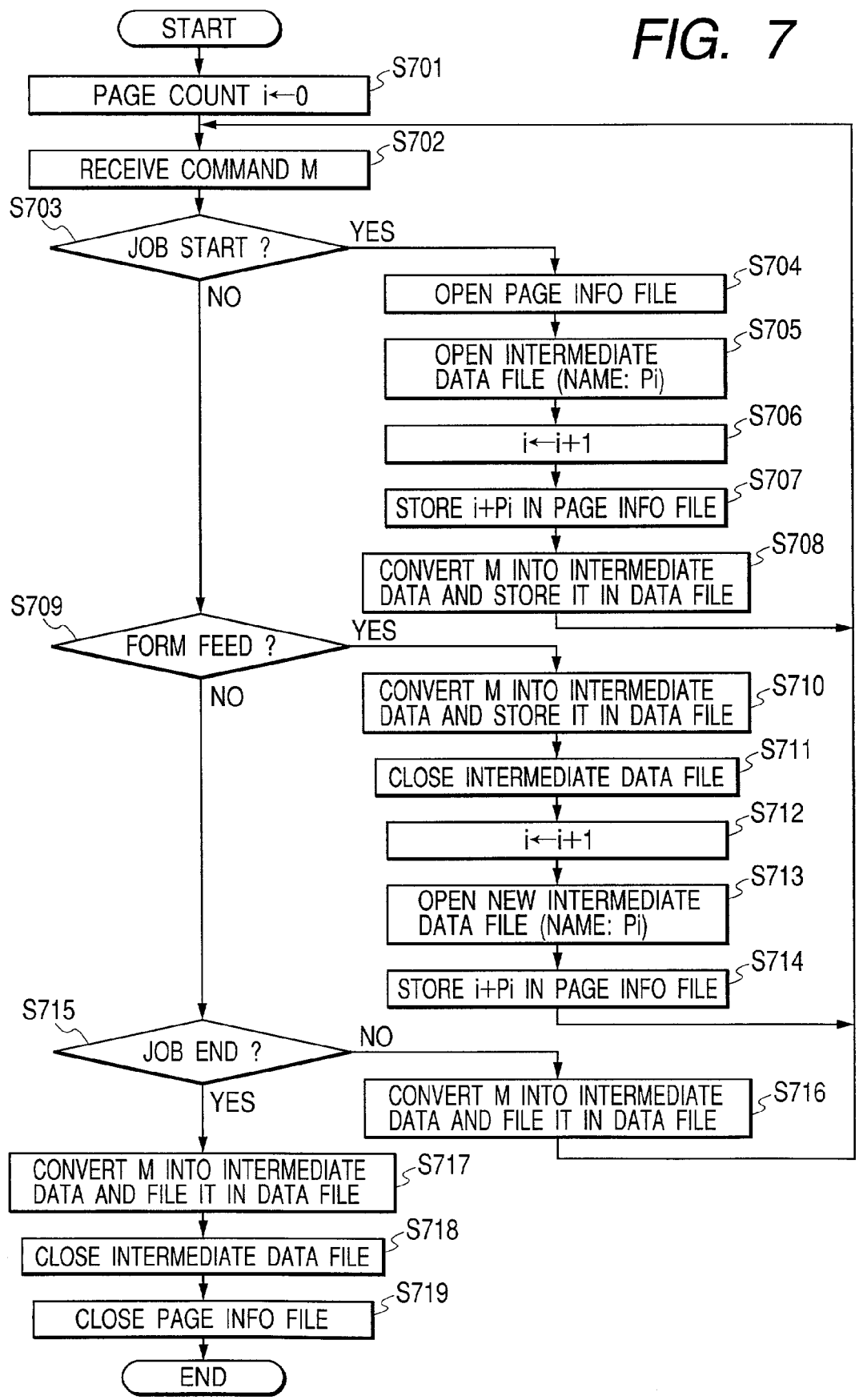
FIG. 7 is a flowchart showing a generating process of intermediate data in the embodiment.

FIG. 7 is a flowchart showing the intermediate data generating step in step S403 in FIG. 4, that is, the step of generating the intermediate data from the draw command in FIG. 6.

First, in step S701 in FIG. 7, a count value of a page counter (i) is initialized to 0.

Subsequently, in step S702, each draw command shown in FIG. 6 is sequentially received one by one from the first command and assumed to be M.

In step S703, whether the draw command M received in step S702 is the "job start command" or not is discriminated. If it is determined in step S703 that the received draw command M is the "job start command", step S704 follows and the page information file for recording the page information is opened.

In next step S705, the intermediate data file to temporarily store the intermediate data of the first page is opened.

In step S706, the count value of the page counter (i) is set to (i+1).

In step S707, a page number (i) and a file name Pi of the intermediate data temporary storage file opened in step S704 are recorded as page information.

In step S708, the received draw command M is converted into the intermediate data and recorded into the opened intermediate data temporary storage file.

The processing routine is subsequently returned to step S702 and the next draw command is received and newly assumed to be M.

If it is determined in step S703 that the received draw command M is not the "job start command", step S709 follows and whether the received draw command M is the "form feed command" or not is discriminated.

If it is determined in step S709 that the received draw command M is the "form feed command", step S710 follows and the draw command M is converted into the intermediate data and recorded in a manner similar to step S708.

Subsequently, step S711 follows and the opened intermediate data temporary storage file of the i-th page which has been recorded at present is closed.

In step S712, the count value of the page counter (i) is set to (i+1).

In step S713, an intermediate data file to temporarily store the intermediate data of the i-th page is newly opened.

In step S714, the page number (i) and the file name Pi of the intermediate data temporary storage file opened in step S713 are recorded as page information.

The processing routine is subsequently returned to step S702 and the next draw command is received and newly assumed to be M.

If it is determined in step S709 that the received draw command M is not the "form feed command", step S715 follows and whether the received draw command M is the "job end command" or not is discriminated.

If it is determined in step S715 that the received draw command M is not the "job end command", step S716 follows and the draw command M is converted into the intermediate data and recorded. The processing routine is returned to step S702 and the next draw command is received and newly assumed to be M.

If it is determined in step S715 that the received draw command M is the "job end command", step S717 follows and the draw command M is converted into the intermediate data and recorded.

Subsequently, step S718 follows and the intermediate data temporary storage file for temporarily storing the intermediate data which is referred to at present is closed.

In step S719, a page information temporary storage file in which the page information has been recorded is closed. The processing routine is finished.

Subsequently, the recording method of the page information in steps S707 and S714 in FIG. 7 and the method of converting it into the intermediate data and the recording method thereof in steps S708, S710, S716, and S717 will be described with reference to FIG. 8.

FIG. 8 is a table showing a structure of the intermediate data temporary storage file of the embodiment. This table is stored into a storage device such as an HD 9 or the like in FIG. 1.

In FIG. 8, the temporary storage file comprises the page information temporary storage file for recording the page information and the temporary storage file for recording the intermediate data every page.

The page information temporary storage file is a file which is recorded when the page information recording step in steps S707 and S714 in FIG. 7, that is, the head page and form feed processes are executed. The present page number (i) and the file name Pi of the intermediate data temporary storage file corresponding to this page are recorded. For example, in FIG. 8, a file name P1 is a file for recording the intermediate data of the first page. The count value of the page number counter (i) is updated every page information recording step. Finally, as the total number of pages, "I" is recorded as (i).

The intermediate data temporary storage file is an area for recording the intermediate data obtained by replacing the draw command by another command format and formed every page divided by the "form feed command" or the like in the draw command in FIG. 6 mentioned above.

The intermediate data can be also formed in a format obtained by collecting a plurality of draw commands into one command, or the like.

The intermediate data editing step in step S404 in FIG. 4 will now be described with reference to a diagram of FIG. 9 and flowcharts of FIGS. 10 and 11.

FIG. 9 is the diagram for explaining a page layout printing function in the intermediate data editing step in the embodiment. In the diagram, L1 to L17 denote logical pages Li. In the example, i=1 to 17 and an example of output pages of 17 pages is shown. In the diagram, F1 and F2 denote pages which are actually outputted to the printer, that is, physical pages Fi. A layout such that the data of each of the logical pages Li is reduced and allocated into one page of the physical sheet (output paper) is obtained.

N denotes the number of N-up pages, that is, the number of logical pages which are arranged into one page of the physical sheet. In this example, N=9 (9-up) and nine logical pages are reduced and arranged into one page of the physical sheet. In FIG. 9, the layout order is set to "top, left→right", the top left position is set to the first page L1 of the logical pages, subsequently, the logical pages L2 and L3 are sequentially arranged to the right. After that, the logical pages L4 and L5 are sequentially arranged to the right at the lower stage. As mentioned above, however, the layout order in the N-up printing function is not limited to the above order. A layout order of "top, right→down→left column" or a layout of "top, left→down→right column" can be also used. As mentioned above, the number (N) of logical pages which are arranged into one page of the physical sheet is not limited only to 9 pages (9-up) but can be also set to 2 pages (2-up), 4 pages (4-up), 8 pages (8-up), 16 pages (16-up), or the like. At this time, the number (I') of pages of the physical sheets Fi is expressed by the quotient of (I/N). Further, assuming that the number of logical pages is equal to 1 page (1-up), a normal direct (equal magnification) copy output such that one logical page is arranged to one page of the physical sheet is performed in a manner similar to the case where the page layout is not performed.

The page number of the intermediate data, the logical pages Li, and the physical pages Fi mentioned above will be further described in detail with reference to FIG. 8.

An intermediate data file in FIG. 8 is generated in order of the draw commands from the application in FIG. 6. The page numbers of the intermediate data file coincide with those outputted by the application.

The logical pages Li are pages in which the page numbers of the intermediate data have been rearranged for the N-up printing function and unconditionally correspond to those of the intermediate data file. For example, with respect to the page numbers 1 to I of the intermediate data file, assuming that the logical pages Li are reversely allocated to LI to L1 and the layout of the physical pages Fi is set to N=1 (1-up), the data is printed in a simple reverse order. As a method of allocating the logical pages and the physical pages, various combinations are possible. The layout style of the output pages can be also changed to various layouts.

A page edition processing flow of the intermediate data editing process in step S404 in FIG. 4 will now be described with reference to FIG. 10.

Figure 10:
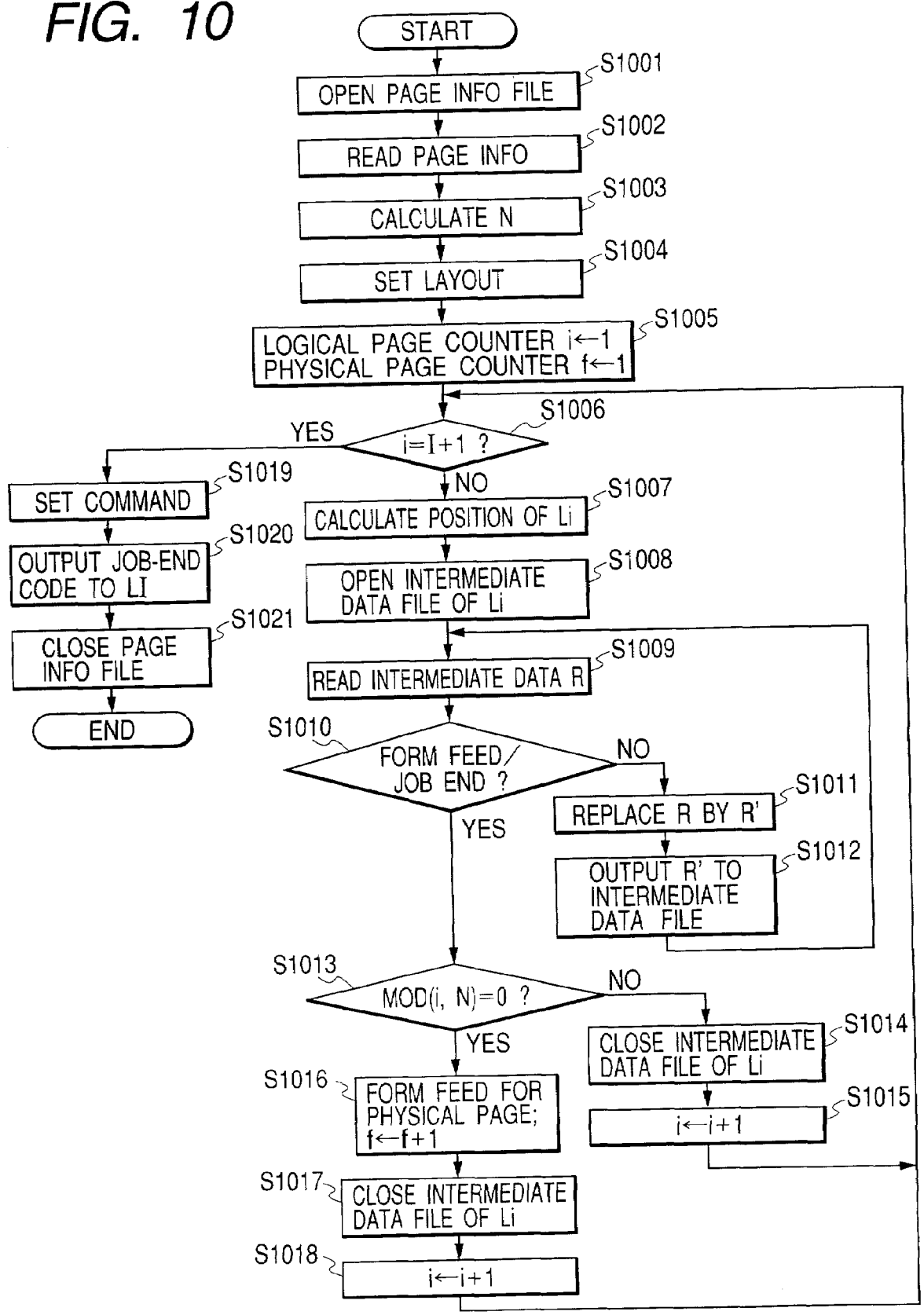
FIG. 10 is a flowchart showing an editing/output process of the intermediate data in the embodiment.

FIG. 10 is the flowchart showing the intermediate data editing step in the embodiment. First, in step S1001, the page information file which has temporarily been stored is opened.

Subsequently, step S1002 follows and the page information is read out from the page information file. As shown in the explanation of FIG. 8, the total number (I) of pages, the file name Pi of the intermediate data recording file of each page, and the like are included in the page information.

In next step S1003, on the basis of the print mode in step S401 in FIG. 4 mentioned above, the number (N) of pages for the N-up printing as an optimum page layout printing is newly calculated.

In step S1004, as a layout set-up, as mentioned above, the logical pages Li are allocated to the page numbers of the intermediate data and a scaling ratio (reduction magnification) S of each of the logical pages Li at the time when they are arranged into the physical page is calculated. Such an allocation is set by the operator at the time of the designation of the print mode in step S401 in FIG. 4 and the scaling ratio S is calculated on the basis of the set allocation. Specifically speaking, like an example described in FIG. 8 mentioned above, a process such that when the reverse order is designated, the logical pages Li are allocated in order opposite to that of the page numbers of the intermediate data file, or the like is executed.

In accordance with the number (N) of N-up pages calculated in step S1003, for example, the scaling ratio S can be simply set to S=1/3 or a magnification that is slightly smaller than 1/3 if N=9 like an example described in FIG. 8 mentioned above.

In step S1005, the count value of the page counter (i) for counting the number of logical pages Li is initialized to "1". A count value of a counter (f) for counting the number of physical pages is also initialized to "1".

In step S1006, whether the count value of the page counter (i) is equal to (i=I+1) with respect to the total number (I) of logical pages or not is discriminated. The total number (I) of logical pages coincides with the number of pages of the intermediate data file.

If i=I+1 in step S1006, step S1019 follows and the command to designate the output style is set again in accordance with a situation.

Subsequently, it is assumed that the edition of all of the intermediate data files has been finished, and the processing routine advances to step S1020. As an end of the job, the job end code is outputted at the last of the intermediate data file corresponding to the logical page LI.

In next step S1021, the page information file is closed and the processing routine is finished.

If i≠I+1 in step S1006, step S1007 follows and a position (reference position) for arranging the logical pages Li to the physical page is calculated. The reference position denotes coordinates showing a position in the physical page where, for example, the coordinates of the top left logical page are arranged, or the like. The reference position is determined on the basis of the number N of logical pages Li to be arranged to one physical page which was calculated in step S1003, the layout order, and the target logical page among the logical pages Li. In the example of the explanation of the physical page in FIG. 9, assuming that the present target logical page is L2, since N=9 (9-up) and the layout order is "top, left→right", if the top left position of the physical page is regarded as a coordinate origin, it is also possible to simply set the coordinates in a manner such that (a coordinate x in the lateral direction)=(a width of physical page 3) and (a coordinate y in the vertical direction)=(a height of an upper blank).

In next step S1008, the intermediate data file corresponding to the logical pages Li is opened.

In step S1009, records of the intermediate data are sequentially read and assumed to be "R".

In step S1010, whether the intermediate data R read in step S1009 indicates the "form feed" or "job end" is discriminated.

If it is determined in step S1010 that the intermediate data R does not indicate the "form feed" or "job end", step S1011 follows and a replacing process of the read intermediate data R is executed.

If it is not particularly necessary to replace, the intermediate data is not replaced and the processing routine can also directly advance to the next step.

In step S1012, the intermediate data R replaced in step S1011 is assumed to be R' and outputted to the intermediate data file and edited in accordance with the scaling ratio S and the position which were calculated in step S1004.

Subsequently, the processing routine is returned to step S1009 and a record of the next intermediate data is obtained and newly set to R.

If it is determined in step S1010 that the intermediate data R indicates the "form feed" or "job end", step S1013 follows and whether Mod(i, N)=0 or not is discriminated to decide whether the form feed operation of the physical page is executed or not. Mod(i, N) is a function for calculating a remainder obtained by dividing the present count value of the logical page counter (i) by the number (N) of logical pages to be arranged to one physical page.

If Mod(i, N)≠0 in step S1013, step S1014 follows and the intermediate data file corresponding to the logical page Li which is at present open is closed.

Subsequently, in step S1015, the logical page counter (i) is set to (i=i+1) and advanced by a value corresponding to one page.

The processing routine is returned to step S1006 mentioned above.

If Mod(i, N)=0 in step S1013, step S1016 follows and the form feed of the physical page is performed. That is, a form feed page record is recorded as intermediate data to the last of the intermediate data file corresponding to the logical page Li which is at present open. Further, the count value of the physical page counter (f) is increased to (f=f+1).

In step S1017, the intermediate data file corresponding to the logical page Li which is at present open is closed.

Subsequently, in step S1018, the logical page counter (i) is set to (i=i+1) and advanced by a value corresponding to one page.

The processing routine is returned to step S1006 mentioned above and whether the processing routine is finished or not is discriminated.

The command setting method in step S1019 in FIG. 10 will now be described with reference to FIG. 11.

Figure 11:
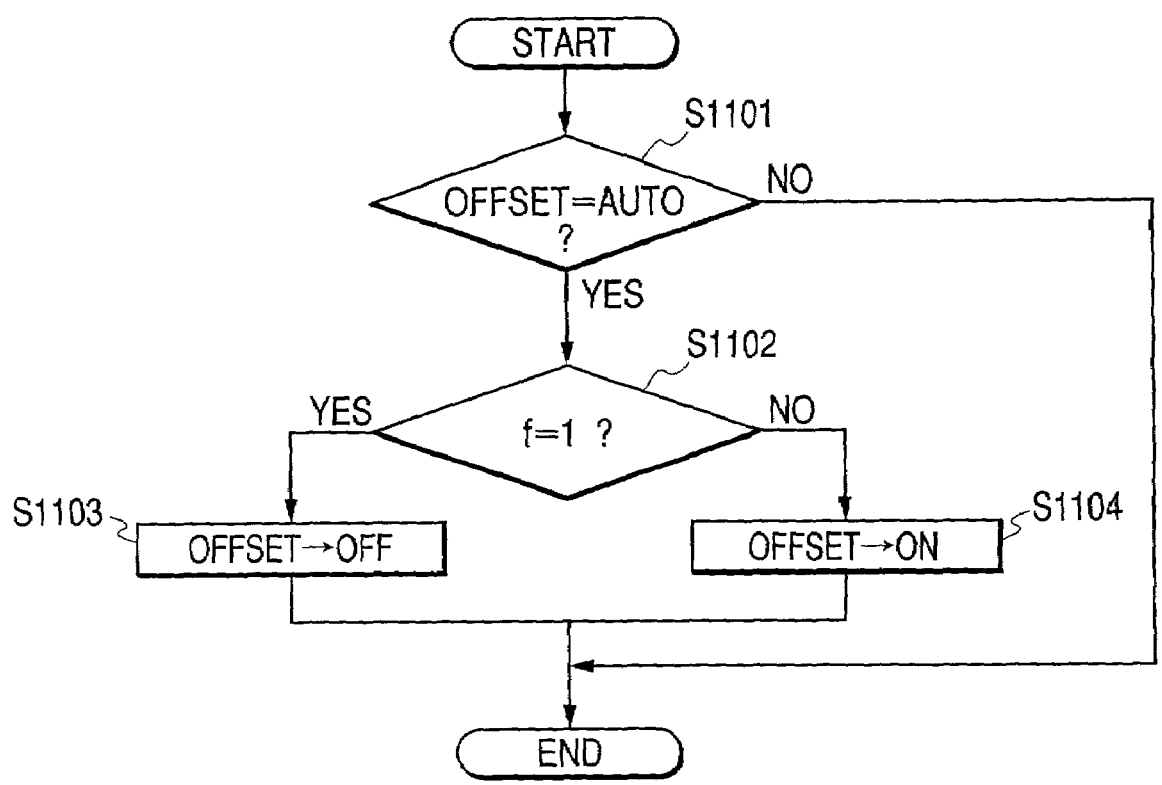
FIG. 11 is a flowchart showing a command setting process in the embodiment.

FIG. 11 is the flowchart showing a step of automatically setting an Offset command in the embodiment.

First, in step S1101, whether the Offset mode designated in step S401 in FIG. 4 is Auto or not is discriminated.

If the Offset mode is not Auto in step S1101, the Offset command is finished without changing the number of pages designated in step S401 in FIG. 4.

If the Offset mode is Auto in step S1101, step S1102 follows and whether the count value of the physical page counter (f) is equal to 1 or not is discriminated.

If f=1 in step S1102, step S1103 follows and the Offset command is reset to OFF and the processing routine is finished.

If f≠1 in step S1102, step S1104 follows and the Offset command is reset to ON and the processing routine is finished.

Thus, whether the document data of one copy is outputted to one sheet of paper when a plurality of logical pages are N-up printed or not is discriminated. If YES, the Offset command is automatically set to OFF. Therefore, the problem such that it becomes difficult to pick up or sort the printed sheets can be solved.

Second Embodiment

The second embodiment according to the invention will now be described.

According to the embodiment, when the printing process of the document data is designated by the application, the N-up printing is designated, further, the rotation output is selected as an output style, and the Auto mode is designated, the intermediate data writing program converts the document data received from the application into the intermediate data, temporarily stores the intermediate data as an intermediate data file, calculates the total number (I) of logical pages, and further, generates a page information file in which the page information including the total number of logical pages has been recorded. After that, in the intermediate data editing program, the page information file is read, the number of physical sheets of the print data of one copy is calculated, and if the number of physical sheets is equal to 1, the command is set again so as to cancel the rotation output mode.

After that, the intermediate data output program outputs the intermediate data to the printer control command generating program (printer driver) or the program existing in the step at the front stage thereof. The printer control command generating program (printer driver) finally generates the printer control command (print data) and prints.

The second embodiment can be similarly realized by changing the designation of the Offset mode in the explanatory diagram of UI in FIG. 5 to the designation of the rotation output mode and, further, replacing the Offset command to the rotation command in each step in FIG. 11.

Also in the above construction, an effect similar to that of the foregoing first embodiment can be obtained.

Figure 12:
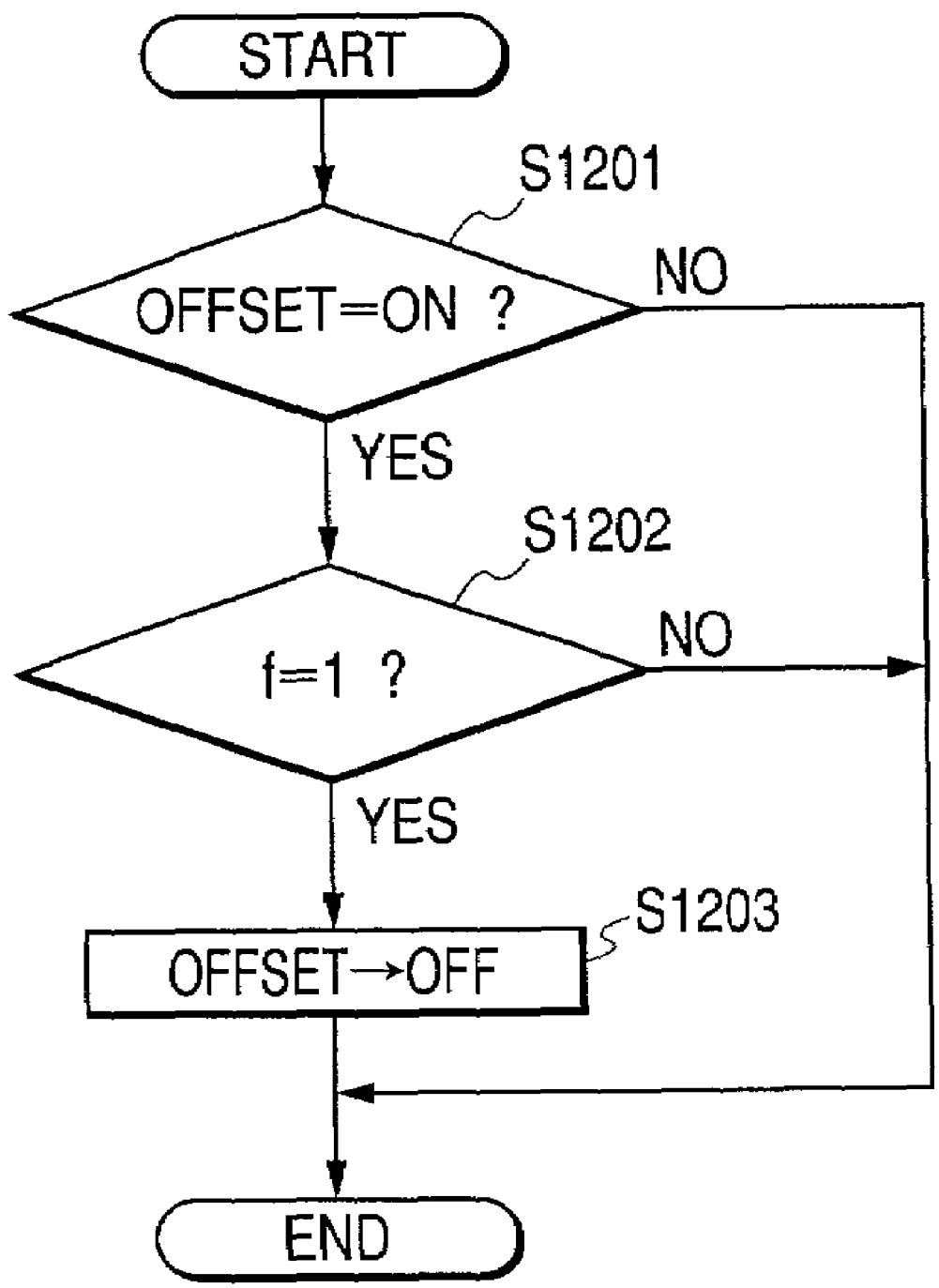
FIG. 12 is a flowchart showing a command setting process according to a modification.
Figure 13A:
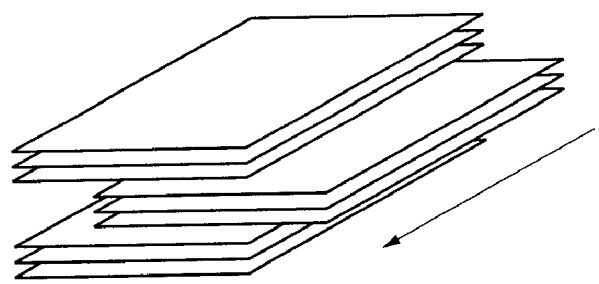
FIGS. 13A and 13B are diagrams showing examples of the Offset output of the conventional technique.
Figure 13B:
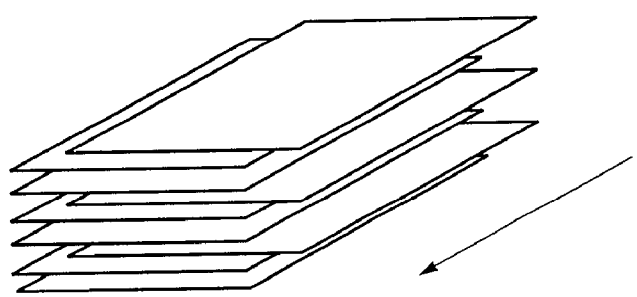
Figure 14:
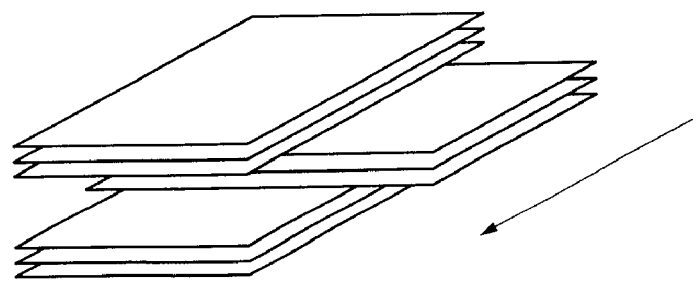
FIG. 14 is a diagram showing an example of the rotation output of the conventional technique.

A modification of the embodiments will be further described with reference to FIG. 12.

As described with reference to FIG. 11, in the first embodiment, if the Offset mode is Auto, a control is made so as to set the Offset command in accordance with the value of the physical page counter. The modification, however, has a construction such that if the Auto mode shown in FIG. 5 is not provided, that is, when only ON or OFF exists as a setting mode of the Offset mode, it is intended to obtain an effect similar to that in the first embodiment.

First, if the Offset mode is not ON in step S1201, the Offset command is finished without changing the number of pages designated in step S401 in FIG. 4.

If the Offset mode is ON in step S1201, step S1202 follows and whether the count value of the physical page counter (f) is equal to 1 or not is discriminated.

If f≠1 in step S1202, the Offset command is held to be ON without changing. The processing routine is finished.

If f=1 in step S1202, step S1203 follows and the Offset command is set to OFF again and the processing routine is finished.

Thus, when a plurality of logical pages is N-up printed, even if the Offset mode has been set to ON, whether the document data of one copy is outputted to one sheet of paper or not is discriminated. When it is outputted to one paper, the Offset command which has been set to ON is automatically switched to OFF, so that the problem such that it becomes difficult to pick up or sort the printed sheets can be solved.

Naturally, the control of the modification can be applied to the rotation output mode described in the second embodiment.

The invention can be also applied to a system constructed by a plurality of apparatuses or can be also applied to an apparatus comprising one equipment.

Naturally, the invention can be also applied to a case where it is accomplished by supplying a program for controlling the printing to a system or an apparatus.

In this case, a computer-readable recording medium in which the program according to the invention has been stored constructs the invention. By reading the program from the recording medium and loading it into a system or an apparatus, the system or apparatus operates in accordance with a predetermined method.

Although the embodiments have been shown and described with respect to the example in which the present print processing program and related data are directly loaded into the RAM 12 and executed, it is also possible to use another construction such that the print processing program and related data are read out from the FD 8 and once stored (installed) into the HD and, when the print processing program is made operative, they are loaded into the RAM 12 from the HD.

The medium for recording the present print processing program is not limited to the floppy disk but can also use a magnetic tape, a CD-ROM, an IC memory card, a DVD, or the like.

It is also possible to use a construction such that the present print processing program is stored into the ROM 13 and it constructs a part of a memory map and can be directly executed by the CPU 11.

The embodiment can be applied also to an information processing apparatus for transmitting the print data to the printer having the duplex printing function. If the printer has the duplex printing function and a duplex printing mode is designated, the information processing apparatus discriminates whether the document data (print data) of one copy is arranged to one page of the physical sheet or not.

For example, assuming that the number of logical pages of the print data of one copy is equal to 4 pages and the 2-up is designated as an N-up printing, if the duplex printing is executed, every two logical pages are arranged to one side of the physical sheet. Therefore, the print data of one copy is arranged to one physical sheet. In the case where the print data of one copy is arranged to one physical sheet, by performing a control such that the Offset output and the rotation output are not performed, an effect similar to that of the invention can be obtained.

As described above, when the Offset or rotation output has been designated as an output style, whether the number of copy papers to which the document data of one copy is printed is equal to 1 or not is discriminated. If YES, the process is automatically executed lest the Offset or rotation output is performed. Therefore, in case of printing the document data by a plurality of copies, a problem such that if it is Offset- and rotation-outputted every paper, the papers become bulky and it is difficult to sort them can be solved. Further, even if the page layout such as N-up or the like has been set, since the number of output papers can be counted, processes similar to those mentioned above can be executed. The above problem can be solved.

The above embodiments have merely been shown as examples of embodying the invention and the technical scope of the present invention must not be limitatively interpreted. That is, many modifications and variations are possible without departing from the technical idea and main features of the appended claims of the invention.

According to the invention as described above, for example, when the Offset print mode or rotation print mode has been set as a print mode, whether the number of papers to which the print data of one copy is printed is equal to 1 or not is discriminated. If YES, the print data such that the Offset printing and rotation printing are not executed can be generated.

What is claimed is:

1. Information processing apparatus provided with a printer driver, comprising:
   finishing command setting means which can set, on a print setting screen of the printer driver, a finishing command, selected from among an enable mode, a disable mode and an automatic mode, to a printer so as to rotation-sort-output or Offset-output document data;
   layout setting means for setting, on the print setting screen of the printer driver, a print layout of the document data;
   counting means for counting the number of physical sheets to which the document data of one copy whose output is desired is allocated;
   print instructing means for instructing execution of printing;
   spooling means for spooling the document data as intermediate data of a data format different from that of the document data;
   intermediate data page editing means for making a layout print control of the intermediate data spooled by said spooling means based on the number counted by said counting means and based on the print layout set by said layout setting means;
   intermediate data output means for outputting the intermediate data whose layout print control is made by said intermediate data page editing means;
   discriminating means for discriminating, based on the counting by said counting means, whether the document data of one copy is printed onto one physical sheet or onto two or more physical sheets, when the automatic mode is set by said finishing command setting means;
   command changing means for changing the finishing command in response to a discrimination made by said discriminating means; and
   print data generating means for adding the finishing command changed by said command changing means to the intermediate data output by said intermediate data output means so as to generate print data.

2. An apparatus according to claim 1, wherein said counting means executes the counting on the basis of said intermediate data spooled by said spooling means.

3. An apparatus according to claim 2, further comprising:
   intermediate data page editing means for making a layout print control of said intermediate data on the basis of the number counted by said counting means and the print layout set by said layout setting means;
   intermediate data output means for outputting said edited intermediate data; and
   print data generating means for generating print data from said outputted intermediate data.

4. A print data generating method comprising:
   a finishing command setting step which can set, on a print setting screen of the printer driver, a finishing command, selected from among an enable mode, a disable mode and an automatic mode, to a printer so as to rotation-sort-output or Offset-output document data;
   a layout setting step of setting, on the print setting screen of the printer driver, a print layout of the document data;
   a counting step of counting the number of physical sheets to which the document data of one copy whose output is desired is allocated,
   a print instructing step of instructing execution of printing; and
   a spooling step of spooling the document data as intermediate data of a data format different from that of the document data,
   intermediate data output means for outputting the intermediate data whose layout print control is made by said intermediate data page editing means;
   discriminating means for discriminating, based on the counting by said counting means, whether the document data of one copy is printed onto one physical sheet or onto two or more physical sheets, when the automatic mode is set by said finishing command setting means;
   command changing means for changing the finishing command in response to a discrimination made by said discriminating means; and
   print data generating means for adding the finishing command changed by said command changing means to the intermediate data output by said intermediate data output means so as to generate print data.

5. A method according to claim 4,
   and wherein the number of physical sheets is counted in said counting step on the basis of the intermediate data spooled by said spooling step.

6. A computer-readable recording medium which records a program, wherein said program comprises:
   a finishing command setting step which can set, on a print setting screen of the printer driver, a finishing command, selected from among an enable mode, a disable mode and an automatic mode, to a printer so as to rotation-sort-output or Offset-output document data;
   a layout setting step of setting, on the print setting screen of the printer driver, a print layout of the document data;
   a counting step of counting the number of physical sheets to which the document data of one copy whose output is desired is allocated,
   a print instructing step of instructing execution of printing;
   a spooling step of spooling the document data as intermediate data of a data format different from that of the document data;
   intermediate data output means for outputting the intermediate data whose layout print control is made by said intermediate data page editing means;
   discriminating means for discriminating, based on the counting by said counting means, whether the document data of one copy is printed onto one physical sheet or onto two or more physical sheets, when the automatic mode is set by said finishing command setting means;

command changing means for changing the finishing command in response to a discrimination made by said discriminating means; and print data generating means for adding the finishing command changed by said command changing means to the intermediate data output by said intermediate data output means so as to generate print data.

7. An information processing apparatus provided with a printer driver, comprising:

finishing command setting means which can set, on a print setting screen of the printer driver, a finishing command selected from among an enable mode and a disable mode to a printer so as to rotation-sort-output or Offset-output document data:

layout setting means for setting, on the print setting screen of the printer driver, a print layout of the document data;

a user interface menu screen, provided by the printer driver, on which a user activates said finishing command setting means to set the finishing command and said layout setting means to set the print layout;

counting means for counting the number of physical sheets to which the document data of one copy whose output is desired is allocated;

spooling means for spooling the document data as intermediate data of a data format different from that of said document data;

intermediate data page editing means for making a layout print control of the intermediate data spooled by said spooling means based on the number counted by said counting means and based on the print layout set by said layout setting means;

intermediate data output means for outputting the intermediate data whose layout print control is made by said intermediate data page editing means;

discriminating means for discriminating, based on the counting by said counting means, whether the document data of one copy is printed onto one physical sheet or onto two or more physical sheets, when the enable mode is set by said finishing command setting means;

command changing means for changing the finishing command in response to a discrimination made by said discriminating means; and print data generating means for adding the finishing command changed by said command changing means to the intermediate data output by said intermediate data output means so as to generate print data.

8. An apparatus according to claim 7, further comprising:
print instructing means for instructing execution of printing,
wherein said counting means executes the counting on the basis of said intermediate data spooled by said spooling means.

9. A print data generating method of an information processing apparatus provided with a print driver and comprising:

a finishing command setting, on a print setting screen of the printer driver, a finishing command setting step selected from among an enable mode and a disable mode to a printer so as to rotation-sort-output or Offset-output document data;

a layout setting step of setting on a print setting screen of the printer driver, a print layout of the document data;

a user interface menu screen step, provided by the printer driver, on which a user performs said finishing command setting step to set the finishing command and said layout setting step to set the print layout;

a counting step of counting the number of physical sheets to which the document data of one copy whose output is desired is allocated;

spooling means for spooling the document data as intermediate data of a data format different from that of said document data;

intermediate data page editing means for making a layout print control of the intermediate data spooled by said spooling means based on the number counted by said counting means and based on the print layout set by said layout setting means;

intermediate data output means for outputting the intermediate data whose layout print control is made by said intermediate data page editing means;

discriminating means for discriminating, based on the counting by said counting means, whether the document data of one copy is printed onto one physical sheet or onto two or more physical sheets, when the enable mode is set by said finishing command setting means;

command changing means for changing the finishing command in response to a discrimination made by said discriminating means; and print data generating means for adding the finishing command changed by said command changing means to the intermediate data output by said intermediate data output means so as to generate print data.

10. A method according to claim 9, further comprising:
a print instructing step of instructing data as intermediate data of a data format different from that of said document data,
and wherein the counting is executed in said counting step on the basis of said intermediate data spooled by said spooling step.

11. A computer-readable recording medium which records a print control program, wherein said program comprises:

a finishing command setting step of setting, on a print setting screen of the printer driver, the finishing command selected from among an enable mode and a disable mode to a printer so as to rotation-sort-output or offset-output document data;

layout setting step for setting, on a print setting screen of the printer driver, a print layout of the document data;

a user interface menu screen step, provided by the printer driver, on which a user activates said finishing command setting step to set the finishing command and said layout setting step to set the print layout;

a counting step of counting the number of physical sheets to which document data of one copy whose output is desired is allocated;

spooling means for spooling the document data as intermediate data of a data format different from that of said document data;

intermediate data page editing means for making a layout print control of the intermediate data spooled by said spooling means based on the number counted by said counting means and based on the print layout set by said layout setting means;

intermediate data output means for outputting the intermediate data whose layout print control is made by said intermediate data page editing means;

discriminating means for discriminating, based on the counting by said counting means, whether the document data of one copy is printed onto one physical sheet or onto two or more physical sheets, when the enable mode is set by said finishing command setting means;

command changing means for changing the finishing command in response to a discrimination made by said discriminating means; and print data generating means for adding the finishing command changed by said command changing means to the intermediate data output by said intermediate data output means so as to generate print data.

12. An apparatus according to claim 1, wherein said finishing command setting means sets the automatic mode in which the finishing command is left to processing by said discriminating means and said command changing means.

13. An apparatus according to claim 1, wherein said layout setting means sets the number of logical pages to be allocated to one physical sheet and a layout order of the logical pages on the physical sheet.

* * * * *

UNITED STATES PATENT AND TRADEMARK OFFICE
CERTIFICATE OF CORRECTION

| | |
|---|---|
| PATENT NO. | : 7,233,411 B2 |
| APPLICATION NO. | : 10/014430 |
| DATED | : June 19, 2007 |
| INVENTOR(S) | : Shigeki Kuroda |

It is certified that error appears in the above-identified patent and that said Letters Patent is hereby corrected as shown below:

ON THE TITLE PAGE:
Item (56), References Cited, Foreign Patent Documents, "EP 729118 A2 * 8/1996" should be deleted.

COLUMN 7:
Line 67, "of-copies" should read --of copies--.

COLUMN 12:
Line 1, "coordinate×in" should read --coordinate × in--.
Line 2, "page 3)" should read --page ÷ 3)--.

COLUMN 15:

Claim 1 should read:

--Information processing apparatus provided with a printer driver, comprising:
finishing command setting means which can set, on a print setting screen of the printer driver, a finishing command, selected from among an enable mode, a disable mode and an automatic mode, to a printer so as to rotation-sort-output or Offset-output document data;
layout setting means for setting, on the print setting screen of the printer driver, a print layout of the document data;
counting means for counting the number of physical sheets to which the document data of one copy whose output is desired is allocated;
print instructing means for instructing execution of printing;
spooling means for spooling the document data as intermediate data of a data format different from that of the document data;
intermediate data page editing means for making a layout print control of the intermediate data spooled by said spooling means based on the number counted by said counting means and based on the print layout set by said layout setting means;
intermediate data output means for outputting the intermediate data whose layout print control is made by said intermediate data page editing means;
discriminating means for discriminating, based on the counting by said counting means, whether the document data of one copy is printed onto one physical sheet or onto two or more physical sheets, when the automatic mode is set by said finishing command setting means;
command changing means for changing the finishing command in response to a discrimination made by said discriminating means; and

UNITED STATES PATENT AND TRADEMARK OFFICE
CERTIFICATE OF CORRECTION

PATENT NO.         : 7,233,411 B2
APPLICATION NO. : 10/014430
DATED                  : June 19, 2007
INVENTOR(S)        : Shigeki Kuroda It is certified that error appears in the above-identified patent and that said Letters Patent is hereby corrected as shown below:

print data generating means for adding the finishing command changed by said command changing means to the intermediate data output by said intermediate data output means so as to generate print data,
        wherein said finishing command setting means disables the finishing command if the counting by said counting means shows that the document data of one copy is printed onto one physical sheet, such that the rotation sort output or the Offset output is not performed, and enables the finishing command if the counting by said counting means shows that the document data of one copy is printed onto two or more physical sheets, such that the rotation sort output or the Offset output is performed.--

COLUMN 16:

Claim 4 should read:

--A print data generating method comprising:
        a finishing command setting step which can set, on a print setting screen of the printer driver, a finishing command, selected from among an enable mode, a disable mode and an automatic mode, to a printer so as to rotation-sort-output or Offset-output document data;
        a layout setting step of setting, on the print setting screen of the printer driver, a print layout of the document data;
        a counting step of counting the number of physical sheets to which the document data of one copy whose output is desired is allocated;
        a print instructing step of instructing execution of printing;
        a spooling step of spooling the document data as intermediate data of a data format different from that of the document data;
        an intermediate data page editing step of making a layout print control of the intermediate data spooled by said spooling step;
        an intermediate data output step of outputting the intermediate data whose layout print control is made by said intermediate data page editing step;
        a discriminating step of discriminating, based on the counting by said counting step, whether the document data of one copy is printed onto one physical sheet or onto two or more physical sheets, when the automatic mode is set by said finishing command setting step;
        a command changing step of changing the finishing command in response to a discrimination made by said discriminating step; and

UNITED STATES PATENT AND TRADEMARK OFFICE
CERTIFICATE OF CORRECTION

PATENT NO. : 7,233,411 B2
APPLICATION NO. : 10/014430
DATED : June 19, 2007
INVENTOR(S) : Shigeki Kuroda It is certified that error appears in the above-identified patent and that said Letters Patent is hereby corrected as shown below:

a print data generating step for adding the finishing command changed by said command changing step to the intermediate data output by said intermediate data output step so as to generating print data,
wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

Claim 6 should read:

--A computer-readable recording medium which records a program, wherein said program comprises:
a finishing command setting step which can set, on a print setting screen of the printer driver, a finishing command, selected from among an enable mode, a disable mode and an automatic mode, to a printer so as to rotation-sort-output or Offset-output document data;
a layout setting step of setting, on the print setting screen of the printer driver, a print layout of the document data;
a counting step of counting the number of physical sheets to which the document data of one copy whose output is desired is allocated;
a print instructing step of instructing execution of printing;
a spooling step of spooling the document data as intermediate data of a data format different from that of the document data;
an intermediate date page editing step of making a layout print control of the intermediate data spooled by said spooling step;
an intermediate data output step of outputting the intermediate data whose layout print control is made by said intermediate data page editing step;
a discriminating step of discriminating, based on the counting by said counting step, whether the document data of one copy is printed onto one physical sheet or onto two or more physical sheets, when the automatic mode is set by said finishing command setting step;
a command changing step of changing the finishing command in response to a discrimination made by said discriminating step; and
a print data generating step of adding the finishing command changed by said command changing step to the intermediate data output by said intermediate data output step so as to generate print data;

UNITED STATES PATENT AND TRADEMARK OFFICE
CERTIFICATE OF CORRECTION

| | | |
|---|---|---|
| PATENT NO. | : 7,233,411 B2 | |
| APPLICATION NO. | : 10/014430 | |
| DATED | : June 19, 2007 | |
| INVENTOR(S) | : Shigeki Kuroda | |

It is certified that error appears in the above-identified patent and that said Letters Patent is hereby corrected as shown below:

wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is a printed onto two or more physical sheets, such that the rotation sort output or the Offset output is performed.--

COLUMN 17:

Claim 7 should read:

--An information processing apparatus provided with a printer driver, comprising:
finishing command setting means which can set, on a print setting screen of the printer driver, a finishing command selected from among an enable mode and a disable mode to a printer so as to rotation-sort-output or Offset-output document data;
layout setting means for setting, on the print setting screen of the printer driver, a print layout of the document data;
a user interface menu screen, provided by the printer driver, on which a user activates said finishing command setting means to set the finishing command and said layout setting means to set the print layout;
a counting means for counting the number of physical sheets to which the document data of one copy whose output is desired is allocated;
spooling means for spooling the document data as intermediate data of a data format different from that of said document data;
intermediate data page editing means for making a layout print control of the intermediate data spooled by said spooling means based on the number of counted by said counting means and based on the print layout set by said layout setting means;
intermediate data output means for outputting the intermediate data whose layout print control is made by said intermediate data page editing means;
discriminating means for discriminating, based on the counting by said counting means, whether the document data of one copy is printed onto one physical sheet or onto two or more physical sheets, when the enable mode is set by said finishing command setting means;
command changing means for changing the finishing command in response to a discrimination made by said discriminating means; and
print data generating means for adding the finishing command changed by said command changing means to the intermediate data output by said intermediate data output means so as to generate print data,

UNITED STATES PATENT AND TRADEMARK OFFICE
CERTIFICATE OF CORRECTION

PATENT NO. : 7,233,411 B2
APPLICATION NO. : 10/014430
DATED : June 19, 2007
INVENTOR(S) : Shigeki Kuroda It is certified that error appears in the above-identified patent and that said Letters Patent is hereby corrected as shown below:

wherein said finishing command setting means disables the finishing command if the counting by said counting means shows that the document data of one copy is printed onto one physical sheet, such that the rotation sort output or the Offset output is not performed, and enables the finishing command if the counting by said counting means shows that the document data of one copy is printed onto two or more physical sheets, such that the rotation sort output or the Offset output is performed.--

Claim 9 should read:

--A print data generating method of an information processing apparatus provided with a print driver and comprising:
a finishing command setting step of setting, on a print setting screen of the printer driver, a finishing command, selected from among an enable mode and a disable mode to a printer so as to rotation-sort-output or Offset-output document data;
a layout setting step of setting, on a print setting screen of the printer driver, a print layout of the document data;
a user interface menu screen step, provided by the printer driver, on which a user performs said finishing command setting step to set the finishing command and said layout setting step to set the print layout;
a counting step of counting the number of physical sheets to which the document data of one copy whose output is desired is allocated;
a spooling step of spooling the document data as intermediate data of a data format different from that of said document data;
an intermediate data page editing step of making a layout print control of the intermediate data spooled by said spooling step based on the number counted by said counting step and based on the print layout set by said layout setting step;
an intermediate data output step of outputting the intermediate data whose layout print control is made by said intermediate data page editing step;
a discriminating step of discriminating, based on the counting by said counting step, whether the document data of one copy is printed onto one physical sheet or onto two or more physical sheets, when the enable mode is set by said finishing command setting step;
a command changing step of changing the finishing command in response to a discrimination made by said discriminating step; and
a print data generating step of adding the finishing command changed by said command changing step to the intermediate data output by said intermediate data output step so as to generate print data,

UNITED STATES PATENT AND TRADEMARK OFFICE
CERTIFICATE OF CORRECTION

PATENT NO. : 7,233,411 B2
APPLICATION NO. : 10/014430
DATED : June 19, 2007
INVENTOR(S) : Shigeki Kuroda It is certified that error appears in the above-identified patent and that said Letters Patent is hereby corrected as shown below:

wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

COLUMN 18:

Claim 11 should read:

--A computer-readable recording medium which records a print control program, wherein said program comprises:
a finishing command setting step of setting, on a print setting screen of the printer driver the finishing command selected from among an enable mode and a disable mode to a printer so as to rotation-sort-output or offset-output document data;
layout setting step for setting, on a print setting screen of the printer driver, a print layout of the document data;
a user interface menu screen step, provided by the printer driver, on which a user activates said finishing command setting step to set the finishing command and said layout setting step to set the print layout;
a counting step of counting the number of physical sheets to which document data of one copy whose output is desired is allocated;
a spooling step of spooling the document data as intermediate data of a data format different from that of said document data;
an intermediate data page editing step of making a layout print control of the intermediate data spooled by said spooling step based on the number counted by said counting step and based on the print layout set by said layout setting step;
an intermediate data output step of outputting the intermediate data whose layout print control is made by said intermediate data page editing step;
a discriminating step of discriminating, based on the counting by said counting step, whether the document data of one copy is printed onto one physical sheet or onto two or more physical sheets, when the enable mode is set by said finishing command setting step;
a command changing step of changing the finishing command in response to a discrimination made by said discriminating step; and

UNITED STATES PATENT AND TRADEMARK OFFICE
CERTIFICATE OF CORRECTION

PATENT NO.           : 7,233,411 B2
APPLICATION NO.  : 10/014430
DATED                   : June 19, 2007
INVENTOR(S)         : Shigeki Kuroda It is certified that error appears in the above-identified patent and that said Letters Patent is hereby corrected as shown below:

a print data generating step of adding the finishing command changed by said command changing step to the intermediate data output by said intermediate data output step so as to generate print data,
      wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,233,411 B2 | |
| APPLICATION NO. | : 10/014430 | |
| DATED | : June 19, 2007 | |
| INVENTOR(S) | : Shigeki Kuroda | |

It is certified that error appears in the above-identified patent and that said Letters Patent is hereby corrected as shown below:

ON THE TITLE PAGE:
Item (56), References Cited, Foreign Patent Documents, "EP 729118 A2 * 8/1996" should be deleted.

COLUMN 7:
Line 67, "of-copies" should read --of copies--.

COLUMN 12:
Line 1, "coordinate×in" should read --coordinate × in--.
Line 2, "page 3)" should read --page ÷ 3)--.

COLUMN 15:

Claim 1, lines 17-56, should read:

--Information processing apparatus provided with a printer driver, comprising:
finishing command setting means which can set, on a print setting screen of the printer driver, a finishing command, selected from among an enable mode, a disable mode and an automatic mode, to a printer so as to rotation-sort-output or Offset-output document data;
layout setting means for setting, on the print setting screen of the printer driver, a print layout of the document data;
counting means for counting the number of physical sheets to which the document data of one copy whose output is desired is allocated;
print instructing means for instructing execution of printing;
spooling means for spooling the document data as intermediate data of a data format different from that of the document data;
intermediate data page editing means for making a layout print control of the intermediate data spooled by said spooling means based on the number counted by said counting means and based on the print layout set by said layout setting means;
intermediate data output means for outputting the intermediate data whose layout print control is made by said intermediate data page editing means;
discriminating means for discriminating, based on the counting by said counting means, whether the document data of one copy is printed onto one physical sheet or onto two or more physical sheets, when the automatic mode is set by said finishing command setting means;
command changing means for changing the finishing command in response to a discrimination made by said discriminating means; and

UNITED STATES PATENT AND TRADEMARK OFFICE
CERTIFICATE OF CORRECTION

PATENT NO. : 7,233,411 B2
APPLICATION NO. : 10/014430
DATED : June 19, 2007
INVENTOR(S) : Shigeki Kuroda It is certified that error appears in the above-identified patent and that said Letters Patent is hereby corrected as shown below:

print data generating means for adding the finishing command changed by said command changing means to the intermediate data output by said intermediate data output means so as to generate print data,
        wherein said finishing command setting means disables the finishing command if the counting by said counting means shows that the document data of one copy is printed onto one physical sheet, such that the rotation sort output or the Offset output is not performed, and enables the finishing command if the counting by said counting means shows that the document data of one copy is printed onto two or more physical sheets, such that the rotation sort output or the Offset output is performed.--

COLUMN 16:

Claim 4, lines 3-36, should read:

--A print data generating method comprising:
        a finishing command setting step which can set, on a print setting screen of the printer driver, a finishing command, selected from among an enable mode, a disable mode and an automatic mode, to a printer so as to rotation-sort-output or Offset-output document data;
        a layout setting step of setting, on the print setting screen of the printer driver, a print layout of the document data;
        a counting step of counting the number of physical sheets to which the document data of one copy whose output is desired is allocated;
        a print instructing step of instructing execution of printing;
        a spooling step of spooling the document data as intermediate data of a data format different from that of the document data;
        an intermediate data page editing step of making a layout print control of the intermediate data spooled by said spooling step;
        an intermediate data output step of outputting the intermediate data whose layout print control is made by said intermediate data page editing step;
        a discriminating step of discriminating, based on the counting by said counting step, whether the document data of one copy is printed onto one physical sheet or onto two or more physical sheets, when the automatic mode is set by said finishing command setting step;
        a command changing step of changing the finishing command in response to a discrimination made by said discriminating step; and

UNITED STATES PATENT AND TRADEMARK OFFICE
CERTIFICATE OF CORRECTION

| | | |
|---|---|---|
| PATENT NO. | : 7,233,411 B2 | |
| APPLICATION NO. | : 10/014430 | |
| DATED | : June 19, 2007 | |
| INVENTOR(S) | : Shigeki Kuroda | |

It is certified that error appears in the above-identified patent and that said Letters Patent is hereby corrected as shown below:

a print data generating step for adding the finishing command changed by said command changing step to the intermediate data output by said intermediate data output step so as to generating print data,
        wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

Column 16, Claim 6, line 41, thru Column 17, line 7, should read:

--A computer-readable recording medium which records a program, wherein said program comprises:
        a finishing command setting step which can set, on a print setting screen of the printer driver, a finishing command, selected from among an enable mode, a disable mode and an automatic mode, to a printer so as to rotation-sort-output or Offset-output document data;
        a layout setting step of setting, on the print setting screen of the printer driver, a print layout of the document data;
        a counting step of counting the number of physical sheets to which the document data of one copy whose output is desired is allocated;
        a print instructing step of instructing execution of printing;
        a spooling step of spooling the document data as intermediate data of a data format different from that of the document data;
        an intermediate date page editing step of making a layout print control of the intermediate data spooled by said spooling step;
        an intermediate data output step of outputting the intermediate data whose layout print control is made by said intermediate data page editing step;
        a discriminating step of discriminating, based on the counting by said counting step, whether the document data of one copy is printed onto one physical sheet or onto two or more physical sheets, when the automatic mode is set by said finishing command setting step;
        a command changing step of changing the finishing command in response to a discrimination made by said discriminating step; and
        a print data generating step of adding the finishing command changed by said command changing step to the intermediate data output by said intermediate data output step so as to generate print data;

UNITED STATES PATENT AND TRADEMARK OFFICE
CERTIFICATE OF CORRECTION

| | | |
|---|---|---|
| PATENT NO. | : 7,233,411 B2 | |
| APPLICATION NO. | : 10/014430 | |
| DATED | : June 19, 2007 | |
| INVENTOR(S) | : Shigeki Kuroda | |

It is certified that error appears in the above-identified patent and that said Letters Patent is hereby corrected as shown below:

wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is a printed onto two or more physical sheets, such that the rotation sort output or the Offset output is performed.--

COLUMN 17:

Claim 7, lines 8-47, should read:

--An information processing apparatus provided with a printer driver, comprising:
finishing command setting means which can set, on a print setting screen of the printer driver, a finishing command selected from among an enable mode and a disable mode to a printer so as to rotation-sort-output or Offset-output document data;
layout setting means for setting, on the print setting screen of the printer driver, a print layout of the document data;
a user interface menu screen, provided by the printer driver, on which a user activates said finishing command setting means to set the finishing command and said layout setting means to set the print layout;
a counting means for counting the number of physical sheets to which the document data of one copy whose output is desired is allocated;
spooling means for spooling the document data as intermediate data of a data format different from that of said document data;
intermediate data page editing means for making a layout print control of the intermediate data spooled by said spooling means based on the number of counted by said counting means and based on the print layout set by said layout setting means;
intermediate data output means for outputting the intermediate data whose layout print control is made by said intermediate data page editing means;
discriminating means for discriminating, based on the counting by said counting means, whether the document data of one copy is printed onto one physical sheet or onto two or more physical sheets, when the enable mode is set by said finishing command setting means;
command changing means for changing the finishing command in response to a discrimination made by said discriminating means; and
print data generating means for adding the finishing command changed by said command changing means to the intermediate data output by said intermediate data output means so as to generate print data,

UNITED STATES PATENT AND TRADEMARK OFFICE
CERTIFICATE OF CORRECTION

PATENT NO. : 7,233,411 B2
APPLICATION NO. : 10/014430
DATED : June 19, 2007
INVENTOR(S) : Shigeki Kuroda It is certified that error appears in the above-identified patent and that said Letters Patent is hereby corrected as shown below:

wherein said finishing command setting means disables the finishing command if the counting by said counting means shows that the document data of one copy is printed onto one physical sheet, such that the rotation sort output or the Offset output is not performed, and enables the finishing command if the counting by said counting means shows that the document data of one copy is printed onto two or more physical sheets, such that the rotation sort output or the Offset output is performed.--

Column 17, Claim 9, line 54 thru Column 18, line 27, should read:

--A print data generating method of an information processing apparatus provided with a print driver and comprising:
    a finishing command setting step of setting, on a print setting screen of the printer driver, a finishing command, selected from among an enable mode and a disable mode to a printer so as to rotation-sort-output or Offset-output document data;
    a layout setting step of setting, on a print setting screen of the printer driver, a print layout of the document data;
    a user interface menu screen step, provided by the printer driver, on which a user performs said finishing command setting step to set the finishing command and said layout setting step to set the print layout;
    a counting step of counting the number of physical sheets to which the document data of one copy whose output is desired is allocated;
    a spooling step of spooling the document data as intermediate data of a data format different from that of said document data;
    an intermediate data page editing step of making a layout print control of the intermediate data spooled by said spooling step based on the number counted by said counting step and based on the print layout set by said layout setting step;
    an intermediate data output step of outputting the intermediate data whose layout print control is made by said intermediate data page editing step;
    a discriminating step of discriminating, based on the counting by said counting step, whether the document data of one copy is printed onto one physical sheet or onto two or more physical sheets, when the enable mode is set by said finishing command setting step;
    a command changing step of changing the finishing command in response to a discrimination made by said discriminating step; and
    a print data generating step of adding the finishing command changed by said command changing step to the intermediate data output by said intermediate data output step so as to generate print data,

UNITED STATES PATENT AND TRADEMARK OFFICE
CERTIFICATE OF CORRECTION

| | |
|---|---|
| PATENT NO. | : 7,233,411 B2 |
| APPLICATION NO. | : 10/014430 |
| DATED | : June 19, 2007 |
| INVENTOR(S) | : Shigeki Kuroda |

It is certified that error appears in the above-identified patent and that said Letters Patent is hereby corrected as shown below:

wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

Column 18, Claim 11, line 35 thru Column 19, line 7, should read:

--A computer-readable recording medium which records a print control program, wherein said program comprises:
       a finishing command setting step of setting, on a print setting screen of the printer driver the finishing command selected from among an enable mode and a disable mode to a printer so as to rotation-sort-output or offset-output document data;
       layout setting step for setting, on a print setting screen of the printer driver, a print layout of the document data;
       a user interface menu screen step, provided by the printer driver, on which a user activates said finishing command setting step to set the finishing command and said layout setting step to set the print layout;
       a counting step of counting the number of physical sheets to which document data of one copy whose output is desired is allocated;
       a spooling step of spooling the document data as intermediate data of a data format different from that of said document data;
       an intermediate data page editing step of making a layout print control of the intermediate data spooled by said spooling step based on the number counted by said counting step and based on the print layout set by said layout setting step;
       an intermediate data output step of outputting the intermediate data whose layout print control is made by said intermediate data page editing step;
       a discriminating step of discriminating, based on the counting by said counting step, whether the document data of one copy is printed onto one physical sheet or onto two or more physical sheets, when the enable mode is set by said finishing command setting step;
       a command changing step of changing the finishing command in response to a discrimination made by said discriminating step; and

UNITED STATES PATENT AND TRADEMARK OFFICE
CERTIFICATE OF CORRECTION

PATENT NO.       : 7,233,411 B2
APPLICATION NO.  : 10/014430
DATED            : June 19, 2007
INVENTOR(S)      : Shigeki Kuroda It is certified that error appears in the above-identified patent and that said Letters Patent is hereby corrected as shown below:

a print data generating step of adding the finishing command changed by said command changing step to the intermediate data output by said intermediate data output step so as to generate print data,
    wherein said finishing command setting step disables the finishing command if the counting by said counting step shows that the document data of one copy is printed onto one physical sheet, such that the rotation sort output or the Offset output is not performed, and enables the finishing command if the counting by said counting step shows that the document data of one copy is printed onto two or more physical sheets, such that the rotation sort output or the Offset output is performed.--

This certificate supersedes the Certificate of Correction issued September 23, 2008.

Signed and Sealed this

Fourteenth Day of October, 2008

JON W. DUDAS
*Director of the United States Patent and Trademark Office*